SUBSCRIPTION TELEVISION SYSTEM

Filed Oct. 31, 1951 5 Sheets-Sheet 1

INVENTOR:
ALEXANDER ELLETT
BY Francis W. Crotty
HIS ATTORNEY.

SUBSCRIPTION TELEVISION SYSTEM

Filed Oct. 31, 1951 5 Sheets-Sheet 2

INVENTOR:
ALEXANDER ELLETT
BY Francis W. Crotty
HIS ATTORNEY.

INVENTOR:
ALEXANDER ELLETT
BY Francis W. Crotty
HIS ATTORNEY

Nov. 13, 1956 A. ELLETT 2,770,803

SUBSCRIPTION TELEVISION SYSTEM

Filed Oct. 31, 1951 5 Sheets-Sheet 4

*INVENTOR:*
ALEXANDER ELLETT
BY Francis W. Crotty
HIS ATTORNEY.

INVENTOR:
ALEXANDER ELLETT
BY Francis W. Crotty
HIS ATTORNEY.

United States Patent Office 2,770,803

Patented Nov. 13, 1956

2,770,803

SUBSCRIPTION TELEVISION SYSTEM

Alexander Ellett, River Forest, Ill., assignor to Zenith Radio Corporation, a corporation of Illinois Application October 31, 1951, Serial No. 254,099

6 Claims. (Cl. 178—5.1)

Figure 1:
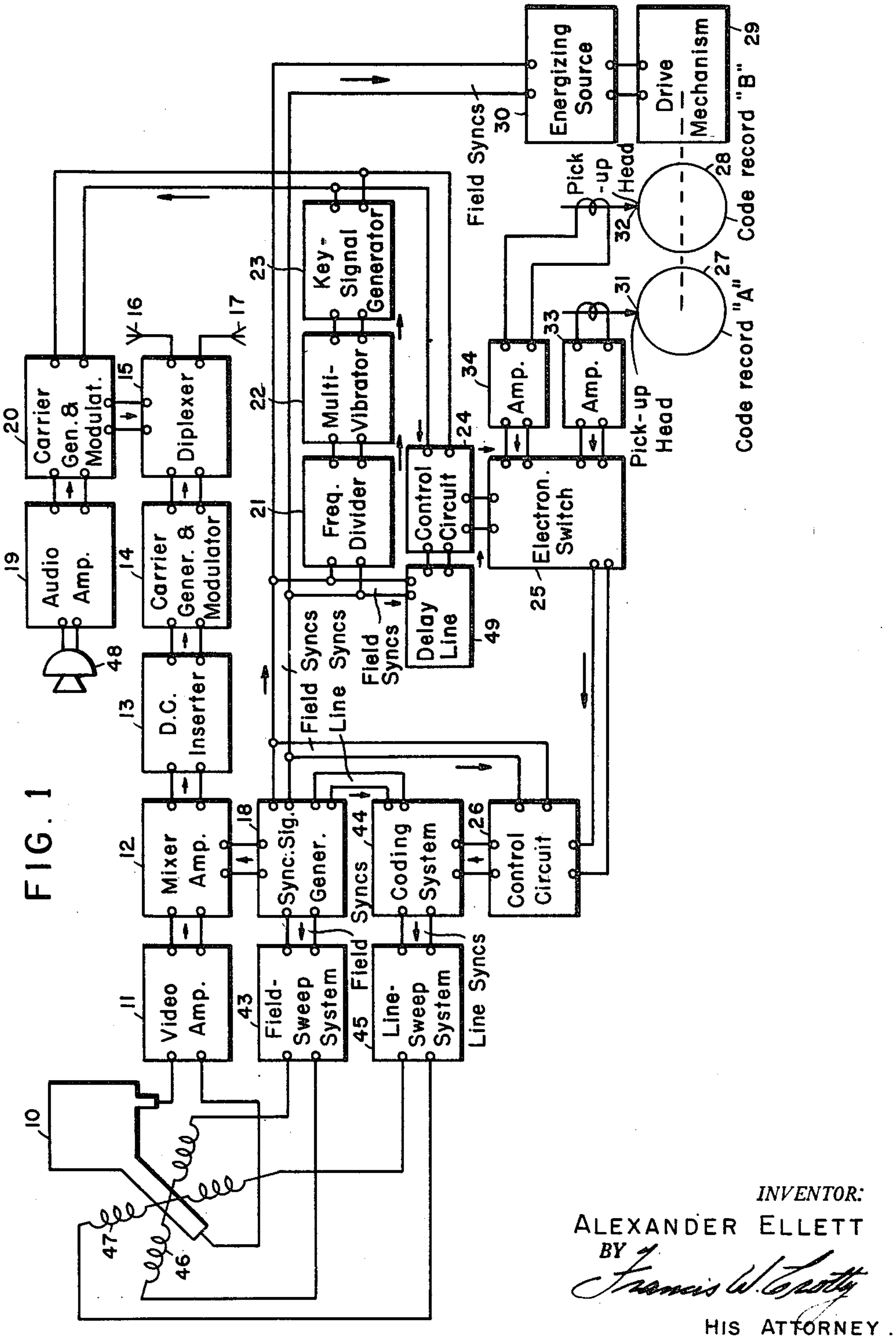

This invention relates to subscription television systems in which a television signal is distributed in coded form to subscriber receivers equipped with suitable decoding apparatus for enabling such receivers to utilize the signal.

Since the invention may be practiced in either a transmitter or receiver, the term "encoding" has been used herein in its generic sense to encompass either coding at the transmitter or decoding at the receiver.

Coding of the television signal in a subscription system is usually effected at the transmitter by apparatus which responds to an actuating or coding signal and changes the mode of operation of the transmitter during spaced operating intervals determined by that signal. The coding signal may be produced by the recurrent scansion of a record having selected code information recorded thereon. The code record may be any known type of signal-storage device; for example, it may be a magnetic tape or disc which is recurrently scanned by a pick-up head or it may comprise an apertured card or storage electrode read by a scanning beam to develop a coding signal. In some subscription systems, a similar code record having information identical to that controlling the transmitter is included in each subscriber receiver and is scanned in synchronism with the scansion of the code record at the transmitter to produce a decoding signal. The decoding signal is utilized to actuate decoding apparatus and effect compensating variations in the mode of operation of the receiver to decode the subscription signal and reproduce the intelligence represented thereby.

Due to the fact that the coding schedule of such systems is repetitive, it is sometimes possible for an unauthorized person to examine the radiated signal and discover the coding schedule. The ease with which this may be done depends on the length and complexity of the coding cycle. In the usual case the limitation represented by the physical size of the code record imposes such restrictions on the coding cycle that the provision of a coding schedule that is sufficiently long or complex to render unauthorized examination and utilization of the subscription signal infeasible presents a difficult problem.

It is, accordingly, an object of the present invention to provide a subscription television system of the above-mentioned type in which the coding schedule is non-repetitive or at least has a repetition cycle sufficiently long to render unauthorized utilization of the radiated signal extremely difficult if not virtually impossible.

A further object of the invention is to provide a subscription television system in which the repetition cycle of the coding schedule is extremely long, or even non-repetitive, and yet which uses code records of standard size.

The subscription system of the present invention includes a transmitter and at least one receiver. The transmitter comprises a generator for developing a television signal representing a scanned subject for transmission to the receiver. A coding device is coupled to the generator for varying the mode of transmission of the television signal to effect coding thereof in accordance with an applied coding signal. Apparatus is included in the transmitter for developing a plurality of coding signals respectively representing different prescribed coding schedules, and means is included therein for developing a key signal representing a selecting schedule. Selecting means is coupled to the apparatus for selectively applying the coding signals to the coding device, and a control circuit is coupled to the key-signal developing means which responds to the key signal for actuating the selecting means to determine the selective application of the plurality of coding signals to the coding device.

The receiver comprises an image reproducing device and circuit means for supplying the television signal to the reproducing device. A decoding device is coupled to the circuit means for effecting compensation in the receiver for variations in the television signal, and the receiver also includes apparatus for developing a plurality of different decoding signals respectively representing the prescribed coding schedules, and includes means for developing a key signal representing the selecting schedule. Selecting means is coupled to the last-mentioned apparatus for selectively applying the decoding signals to the decoding device, and a control circuit is coupled to the last-mentioned key-signal developing means for controlling the selecting means and the selective application of the decoding signal to the decoding device.

Figure 2:
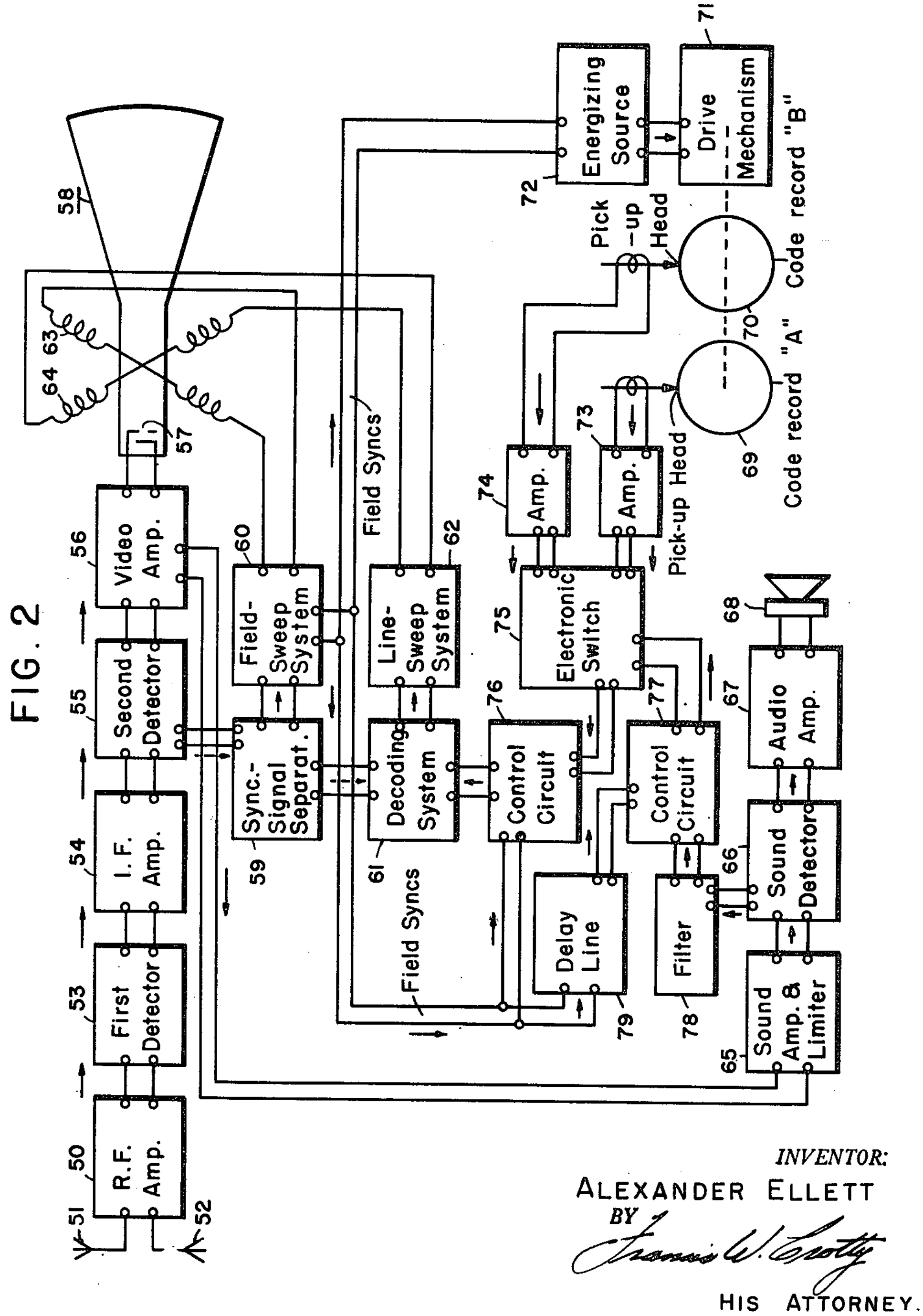
Figure 3:
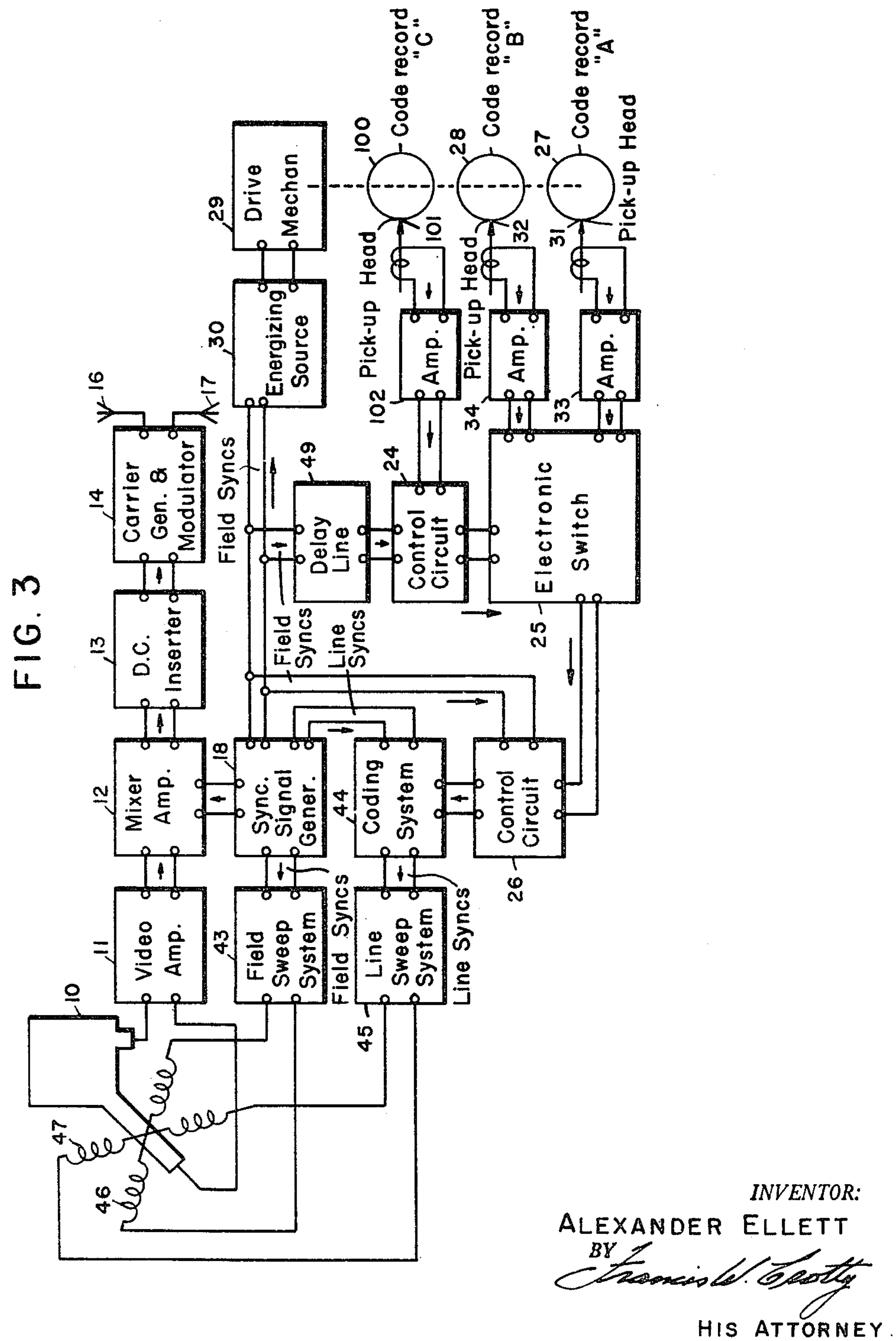
Figure 4:
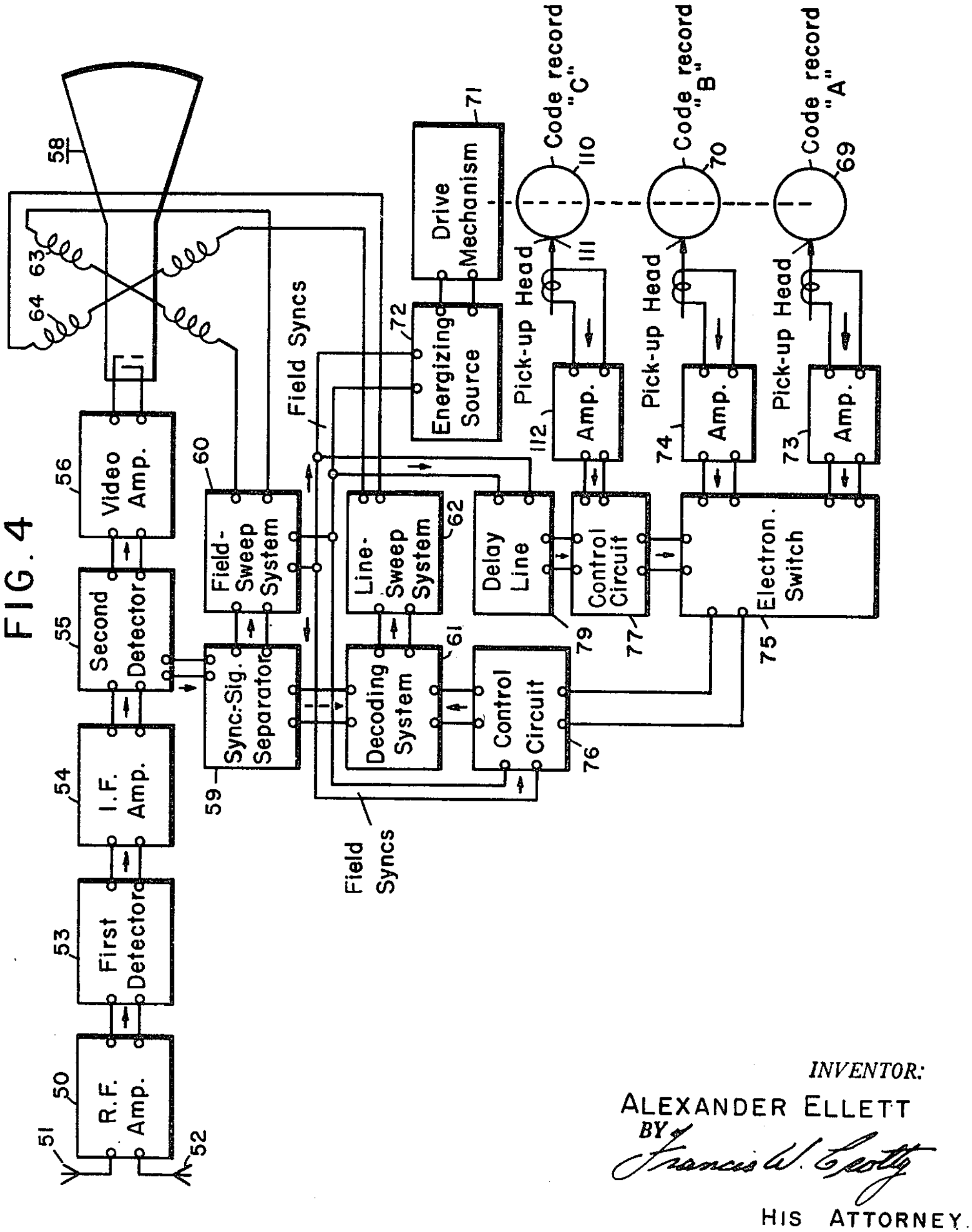
Figure 5:
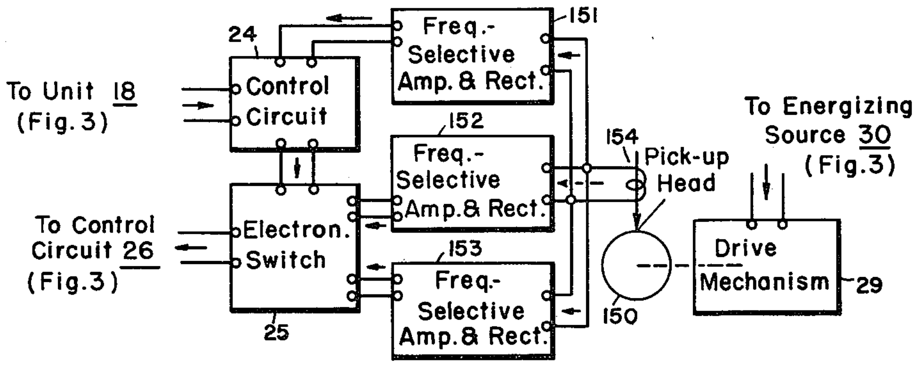
Figure 6:
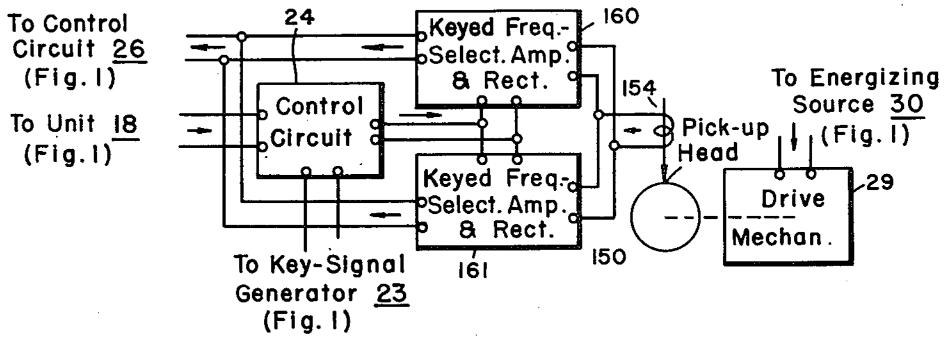

The features of this invention which are believed to be new are set forth with particularity in the appended claims. The invention itself, however, together with further objects and advantages thereof may best be understood by reference to the following description when taken in conjunction with the accompanying drawings, in which:

Figure 1 is a transmitter constructed in accordance with one embodiment of the invention, Figure 2 is a receiver for operation in conjunction with the transmitter of Figure 1, Figures 3 and 4 respectively represent a transmitter and receiver constructed in accordance with a second embodiment of the invention, and, Figures 5 and 6 illustrate further embodiments of the invention.

The transmitter of Figure 1 includes a picture-converting device 10 which may be an iconoscope, image-orthicon or other well-known type for converting the shade values of the scene to be televised into a video signal that is applied to the input circuit of a video amplifier 11 of one or more stages. The output circuit of video amplifier 11 is connected to a mixer amplifier 12 which, in turn, is coupled through a direct-current inserter 13 to a carrier-wave generator and modulator 14. The output terminals of modulator 14 are connected to a diplexer 15 having output terminals coupled to an appropriate antenna circuit 16, 17.

The transmitter also includes a synchronizing- and blanking-signal generator 18 which develops line- and field-synchronizing pulses and associated blanking pedestals. Generator 18 is connected to mixer amplifier 12, to a field-sweep system 43, and through a coding system 44 to a line-sweep system 45. The output terminals of sweep systems 43 and 45 are connected, respectively, to the field-deflection elements 46 and line-deflection elements 47 associated with device 10.

A sound transducer or microphone 48 converts the sound intelligence associated with the televised scene into an audio signal which is applied to an audio amplifier 19 of any desired number of stages. The output terminals of amplifier 19 are coupled to a carrier-wave generator and modulator 20 which, in turn, is connected through diplexer 15 to antenna 16, 17.

Generator 18 is also connected to a frequency divider 21 which may be of the random type disclosed in copending application Serial No. 32,457, filed in the name of Erwin M. Roschke, June 11, 1948, and issued March 11, 1952 as Patent 2,588,413, entitled "Random Frequency Divider" and assigned to the present assignee. The output terminals of the frequency divider are connected to an Eccles-Jordan multivibrator 22. That is, multivibrator 22 has two stable operating conditions and may be triggered between these conditions by successive pulses of like polarity. Multivibrator 22 is connected to a key-signal generator 23 and turns the generator on whenever the multivibrator is in a selected one of its two operating conditions. The key-signal generator is coupled to carrier-wave generator and modulator 20 and impresses a burst of key signal on the modulator during the intervals when it is turned on by the multivibrator. The frequency of the key signal is preferably outside of the audible range so that the key signal does not interfere with the audio intelligence applied to modulator 20. The output terminals of key-signal generator 23 are further connected to a control circuit 24 having other input terminals connected to generator 18 through a delay line 49 and having output terminals connected to an electronic switch 25. The output terminals of switch 25 are connected to a second control circuit 26, having further input terminals connected to generator 18 and output terminals connected to coding system 44.

The transmitter additionally includes a pair of code records 27 and 28 which may be magnetic discs bearing code information magnetically recorded about their peripheries in the form of irregularly-spaced pulses. Alternately, the records may take the form of notched discs with associated reluctance type pick-up heads; or any other known form of code record. It is contemplated that a selected coding schedule be recorded on disc 27 and a different coding schedule be recorded on disc 28. The discs are concurrently rotated by means of a common driving mechanism 29 energized from a source 30 connected to generator 18 for synchronizing purposes. Discs 27 and 28 have pick-up heads 31 and 32 respectively associated therewith, the pick up heads being connected to switch 25 through amplifiers 33, 34.

As previously stated, device 10 transforms the shade values of the scene to be televised into a video signal which is amplified in video amplifier 11. The amplified signal is combined in mixer 12 with line- and field-synchronizing pulses and associated pedestals derived from generator 18 to produce a television signal at the output terminals of the mixer. The television signal is appropriately adjusted as to background level by direct-current inserter 13 and, in accordance with present-day standards, is amplitude-modulated on a picture carrier in unit 14 and applied to antenna circuit 16, 17 through diplexer 15. Generator 18 supplies field-synchronizing pulses to field-sweep system 43 to synchronize the field scansion of device 10. Similarly, it supplies line-synchronizing pulses to line-sweep system 45 to synchronize the line scansion of the device. However, coding system 44 which is interposed between the line-sweep system and the generator is controlled by control circuit 26 to vary from time to time the timing of the line-synchronizing pulses as applied to the line-sweep system. This causes a variation in the line scansion of device 10 and a corresponding variation in the timing of the video components of the television signal developed by mixer 12 relative to its line-synchronizing components. In this manner, the television signal may be considered to be effectively coded since its reproduction in a standard television receiver depends upon an invariable timing between its various components. The sound intelligence accompanying the televised scene is converted into an audio signal by device 48 and amplified in audio amplifier 19. The amplified audio signal, in accordance with present-day standards, is frequency-modulated on an appropriate sound carrier in modulator 20 and the modulated carrier is applied to antenna circuit 16, 17 through diplexer 15 in well-known fashion. The resulting signal radiated by the antenna includes an amplitude-modulated picture carrier, and a frequency-modulated sound carrier frequency-displaced therefrom by a selected amount.

Control of the coding system 44 to achieve coding of the radiated signal is accomplished in the following manner: As previously stated, magnetic discs 27 and 28 each have distinct prescribed coding schedules recorded thereon in the form of a series of irregularly spaced pulses. These discs are rotated by drive mechanism 29 so that the coding schedules are recurrently scanned by pick-up heads 31 and 32. The rotation of the discs is synchronized with the field-synchronizing frequency of the system by reason of the connection of energizing source 30 to generator 18 to derive field-synchronizing pulses therefrom. However, the speed of rotation of the discs is preferably at a sub-multiple field rate. Pick-up heads 31 and 32 develop a pair of coding signals each having the form of a repeating series of irregularly-timed pulses, the repeating characteristics of the coding signals corresponding to the scanning cycles of discs 27 and 28. The spacing and width of the pulses recorded on discs 27 and 28 are preferably such that when the discs are rotated at the prescribed speed, the pulses of the coding signals occur at intervals representing several field periods and each have a duration also corresponding to several field periods. The coding signals are amplified in amplifiers 33 and 34 and are applied to electronic switch 25 which is actuated by control circuit 24 to impress one or the other on control circuit 26. The latter control circuit responds conjointly to the coding-signal pulses derived from switch 25 and to field-synchronizing pulses from generator 18 to impress a series of actuating pulses on coding system 44 corresponding to the particular coding-signal pulses derived from switch 25. However, each actuating pulse impressed on coding system 44 is initiated and terminated by the field-synchronizing pulse following the beginning and ending of the corresponding pulses of the coding signal delivered by switch 25. The coding system responds to the actuating pulses impressed thereon by control circuit 26 and alters for the duration of each such pulse the timing of the line-synchronizing pulses applied to the line-sweep system from one value to another and, therefore, alters the relative timing between the video- and line-synchronizing components of the television signal for the duration of such pulses. Since the pulses from control circuit 26 start and stop with the occurrence of field-synchronizing pulses, timing changes in the components of the television signal occur during field-retrace intervals and distortion in the television signal that could arise should the timing changes occur during trace intervals is precluded.

Generator 18 supplies field-synchronizing pulses to random frequency divider 21 and the randomly divided pulses actuate multivibrator 22, causing it to energize key-signal generator 23 during random spaced intervals. The resulting bursts of key signal from the key-signal generator are modulated on the sound carrier in modulator 20 for transmission to subscriber receivers concurrently with the television signal. Of course, the key signal can be distributed to subscriber receivers by any other known means, such as over a line circuit or as an independent radiation.

The bursts of key signal are also supplied to control circuit 24 concurrently with delayed field-synchronizing pulses from delay line 49. The delay line delays these pulses by a selected interval corresponding, for example, to half a field-trace interval. The purpose of this is to assure that under no conditions will control circuits 24 and 26 operate units 25 and 44 simultaneously, for such simultaneous operation at the transmitter is difficult to duplicate at the receivers due to delays inherent in the system. Control circuit 24 impresses a series of pulses on electronic switch 25 corresponding to the bursts of key signal, but each having leading and trailing edges corresponding to the delayed field-synchronizing pulses following the beginning and ending of each such burst. The pulses from the control circuit operate the switch so that coding system 44 is actuated in accordance with the code record established on disc 27 during certain intervals and in accordance with the code record established on disc 28 during intervening intervals. That is, switch 25 is actuated at random intervals to impress first one and then the other of the coding signals derived from discs 27 and 28 on control circuit 26 and these random intervals are indicated to subscriber receivers by the key-signal bursts developed by generator 23 and transmitted as a modulation component of the sound carrier. Consequently, the coding schedule of the television signal is non-repetitive, for although coding signals having repeating characteristics are derived from the individual discs, the application of the coding signals to control circuit 26 and thus the coding schedule of the subscription television signal is controlled in a non-repetitive, random fashion by control circuit 24. Since the coding schedule of the subscription television signal is non-repetitive, it is virtually impossible for an unauthorized person to determine the schedule by analysis of the subscription signal.

The various components of the transmitter of Figure 1 are extremely well known to the art, or are discussed in detail in Patent No. 2,547,598, issued April 3, 1951, in the name of Erwin M. Roschke, entitled "Subscription, Image Transmission System and Apparatus" and assigned to the present assignee. For that reason, a detailed description of the construction of the various units and circuitry involved therein is believed to be unnecessary herein and has been omitted to simplify the understanding of the invention. It may, however, be helpful to review briefly the characteristics of units 44, 24, 25 and 26.

Unit 44 may comprise a delay line and a switch having two operating conditions: one, in which a delay is introduced into the line-sweep system; and another, in which the delay is removed. Unit 26 actuates this switch between its operating conditions and may be considered normally to condition the switch to delete the added delay of its delay line. However, actuating or code pulses applied to unit 26 actuate the switch from time to time to reinsert the delay as determined by a coding schedule represented by time-spaced pulses applied to unit 26. When any such pulse arrives at unit 26, it is not effective immediately but actuates unit 26 upon the arrival of the first field-synchronizing pulse following the start of the code pulse whereupon the delay is added to the line system. The delay is continuously effective up to the end of the code pulse and to the time of the first field-synchronizing pulse following the end of the code pulse whereupon the delay is removed. Suitable counterparts of the delay-type coding system and the switch operator are disclosed in the above-identified Roschke patent.

Switch 25 may comprise two vacuum-tube repeaters feeding a common output circuit and controlled to be conductive in alternation. Control circuit 24 which is the operator for switch 25 is generally similar to unit 26 but responds conjointly to key-signal bursts from generator 23 and to field-synchronizing pulses from generator 18. The output pulses from switch 25, taken in alternation but essentially at random from discs 27 and 28, constitute the coding signal which impresses the coding schedule of the telecast on control circuit 26.

The receiver of Figure 2 comprises a radio-frequency amplifier 50 of any desired number of stages having input terminals connected to an antenna circuit 51, 52 and output terminals connected to a first detector 53. The first detector is coupled to an intermediate-frequency amplifier 54 of one or more stages which, in turn, is coupled to a second detector 55. The second detector is connected through a video amplifier 56 to the input electrodes 57 of a cathode-ray image-reproducing device 58. Second detector 55 is also connected to a synchronizing-signal separator 59 which, in turn, is coupled to a field-sweep system 60 and through a decoding system 61 to a line-sweep system 62. The output terminals of sweep systems 60, 62 are connected respectively to the field-deflection elements 63 and line-deflection elements 64 associated with device 58. Video amplifier 56 is also coupled to a sound amplifier and amplitude-limiter 65 which, in turn, is coupled through a sound detector 66 and audio amplifier 67 to a sound-reproducing device 68.

The receiver further comprises a pair of magnetic discs 69 and 70 respectively having code patterns recorded thereon identical to those of discs 27 and 28 at the transmitter. Discs 69 and 70 are rotated by a drive mechanism 71 which is energized by a suitable energizing source 72 coupled to field-sweep system 60 for synchronizing purposes. Discs 69 and 70 respectively have pick-up heads associated therewith, the pick-up heads being connected to amplifiers 73, 74. The output terminals of amplifiers 73 and 74 are connected to an electronic switch 75 which is connected to a control circuit 76. Control circuit 76 has input terminals connected to field-sweep system 60 and output terminals connected to decoding system 61. Electronic switch 75 is actuated by a control circuit 77 connected through a delay line 79 to field-sweep system 60 and further connected to sound detector 66 through a filter 78 selective to the key-signal frequency.

The receiver may be tuned to utilize a subscription telecast from the transmitter of Figure 1. The radiated signal is intercepted by antenna 51, 52 and amplified in radio-frequency amplifier 50. The amplified signal is heterodyned to the selected intermediate frequency of the receiver in first detector 53, and the resulting intermediate-frequency signal is amplified in intermediate-frequency amplifier 54 and detected in second detector 55. The composite video signal from the second detector is amplified in video amplifier 56, and is then applied to the input electrodes 57 of reproducing device 58 to control the intensity of the cathode-ray beam thereof in accordance with the image intelligence.

The synchronizing components of the incoming television signal are separated out in separator 59, which applies field-synchronizing pulses to field-sweep system 60 and line-synchronizing pulses through decoding system 61 to line-sweep system 62. In this manner, the sweep systems and, therefore, the line- and field-scansions of reproducing device 58 are synchronized with the incoming signal. Decoding system 61 is actuated in a manner to be described to impart compensating variations in the timing of the line-synchronizing pulses applied to line-sweep system 62 so that the aforementioned variations in timing between the video and line-synchronizing components of the television signal may be corrected to enable device 58 to reproduce properly the picture intelligence.

In accordance with intercarrier-sound principles, detector 55 develops an intercarrier signal frequency-modulated with the sound intelligence. The intercarrier signal is selected by means of appropriate selecting networks in the output circuit of video amplifier 56 and applied to unit 65 wherein it is amplified and amplitude limited. The signal is then detected in circuit 66, amplified in audio amplifier 67 and the sound intelligence reproduced in device 68. The aforementioned bursts of key signal also appear as modulation components of the intercarrier signal and are selected by filter 78.

As previously pointed out, discs 69 and 70 respectively have code information recorded thereon identical to the code information of discs 27 and 28 at the transmitter. The receiver discs are driven in synchronism with the transmitter discs by drive mechanism 71 due to the synchronization of energizing source 72 by field-synchronizing pulses derived from field-sweep system 60. Initial phasing of discs 69, 70 and the transmitter discs may be accomplished by any known means, for example, the arrangement disclosed in copending application Serial No. 75,988, filed February 12, 1949, in the name of Roswell H. Herrick et al., entitled "Subscriber Signalling System" and assigned to the present assignee, may be used to advantage. The pick-up heads of discs 69 and 70 produce decoding signals having identical characteristics to the corresponding coding signals at the transmitter, and the decoding signals are amplified in amplifiers 73 and 74 and applied to switch 75. Control circuit 77 responds to the key-signal bursts from filter 78 and to delayed field-synchronizing pulses derived from delay line 79 to actuate switch 75 in time coincidence with the actuation of switch 25 at the transmitter. In this manner, the signal applied to control circuit 76 by switch 75 is identical to the signal applied to control circuit 26 at the transmitter. Control circuit 76 responds to the signal from switch 75 and to field-synchronizing pulses derived from field-sweep system 60 to actuate decoding system 61 in time coincidence with the actuation of coding system 44 at the transmitter. Therefore, the line-synchronizing pulses applied to line-sweep system 62 are delayed an appropriate amount and at the proper times by decoding system 61 so that the line scansion of device 58 is controlled to compensate the afore-described variations in the television signal.

The various units of the receiver, with the exception of decoding system 61 and control circuits 76 and 77, are in themselves extremely well known to the art. For this reason, a detailed explanation of the circuitry involved in these units is believed to be unnecessary. The decoding system and control circuits may be similar in construction to those utilized at the transmitter and are described in detail in the aforesaid Patent 2,547,598 to Roschke.

The transmitter of Figure 3 is similar in many respects to that of Figure 1 and corresponding components thereof have been designated by like numerals. It differs from that of Figure 1 in that the switching between the code records is controlled in accordance with a key signal recorded on a third code record so that there is no necessity for transmitting key-signal information from transmitter to receiver.

As shown in Figure 3, the transmitter includes a third code record which may be a magnetic disc 100 with an associated pick-up head 101, the third disc being rotated by drive mechanism 29 together with code discs 27, 28. However, it is preferable that disc 100 rotates at a slower speed than discs 27 and 28 and this may be accomplished by the use of a suitable reduction gear in the drive of disc 100. Pick-up head 101 is coupled to an amplifier 102 having output terminals connected to control circuit 24. A selected key signal is magnetically recorded on disc 100 in the form, for example, of an irregularly-spaced series of pulses. Upon scansion of disc 100 by pick-up head 101 the recorded information is converted into an electrical key signal which repeats with each revolution of the disc. This key signal is amplified in amplifier 102 and applied to control circuit 24 to control switch 25.

With the last-described arrangement, the repetition cycle of the coding schedule of the transmitted television signal, while not indefinite, is extremely long so that unauthorized utilization of the signal is rendered most difficult. The extreme length of the repetition cycle is due to the fact that the coding signal applied to control circuit 26 is derived selectively, and in accordance with a further code schedule, from discs 27 and 28, the selection of the signals from the discs being in accordance with a key signal derived from disc 100.

The receiver of Figure 4 is, likewise, similar in many respects to the receiver of Figure 2 and corresponding components thereof have been designated by the same reference numerals. The receiver of Figure 4 includes a disc 110 which is driven by drive mechanism 71 in conjunction with discs 69 and 70, these discs all being driven at speeds identical to corresponding discs at the transmitter. Disc 110 has key-signal pulses recorded thereon identical to the pulses recorded on disc 110 at the transmitter, and these key-signal pulses are scanned by a pick-up head 111 associated with the disc. The resulting decoding signal is amplified in amplifier 112 and applied to control circuit 77 so that switch 75 is operated in time coincidence with switch 25 at the transmitter. This enables the receiver effectively to decode the received signal and reproduce the image intelligence.

The coding signal source of Figure 3 can be modified in the manner shown in Figure 5. In the latter embodiment the first and second coding signals and the key signal are recorded on magnetic disc 150 as bursts having different frequencies corresponding to each of the signals. Frequency-selective amplifiers and rectifiers 151, 152 and 153 are connected to a pick-up head 154 associated with disc 150. Unit 150 responds only to the bursts from the pick-up head whose frequency corresponds to the key signal, whereas units 152 and 153 respond respectively to the bursts corresponding to the first and second coding signals. Unit 150 rectifies the key-signal bursts and supplies pulses to control circuit 24 corresponding to the selecting schedule established by the key-signal recordings on disc 150. Units 152 and 153 rectify the first and second coding signal bursts and supply pulses to electronic switch 25 corresponding to the first and second code schedules established by the coding-signal bursts on disc 150. As previously, control circuit 24 operates switch 25 so that it translates the pulses from either unit 152 or unit 153 in accordance with the selecting schedule. Of course, the embodiment of Figure 5 can be included in the system of Figure 1, in which case control circuit 24 is operated by the key signal derived from generator 23 rather than from unit 151.

Figure 6 shows yet another embodiment of the coding signal source which, as illustrated, can be included directly into the system of Figure 1, although such an arrangement can also be used in the system of Figure 3. In the embodiment of Figure 6 the first and second coding signals are recorded as bursts of different frequencies on disc 150 and selected from pick-up head 154 by frequency-selective amplifiers 160 and 161, the bursts being rectified in these amplifiers as in the last embodiment. Amplifiers 160 and 161 are constructed in a manner well-known to the art so that they can be keyed by applied keying pulses. The amplifiers are controlled directly by control circuit 24 dispensing with the necessity for a separate electronic switch. The pulses produced by control circuit 24 render one of the amplifiers conductive and the other non-conductive for their individual duration, whereas the conductivity of the amplifiers is reversed during the intervals between these pulses. In this manner, the coding signal from either unit 160 or unit 161 is applied to control circuit 26, as determined by the selecting schedule established by the key signal applied to control circuit 24.

It is to be noted that although the illustrated systems effect coding by varying a timing characteristic of the television signal, the invention is not limited to any particular coding technique. Rather, the present invention is directed to the provision of apparatus for developing coding and decoding signals at the subscription transmitter and various receivers which have a repetition cycle that is either infinite or at least extremely long. These signals determine the timing schedule in accordance with which the coding technique selected is exercised.

The invention provides, therefore, an improved subscription system in which the coding schedule is derived from storage devices incorporated into the transmitter and into each subscriber receiver. As described herein, the construction of the system is such that no single device is used continuously, but each is selected, preferably, at random intervals. This enables the cycle of the coding schedule to be extremely long or, as in the case of the embodiment of Figure 1, provides a non-repetitive coding schedule.

While particular embodiments of the invention have been shown and described, modifications may be made, and it is intended in the appended claims to cover all such modifications as fall within the true spirit and scope of the invention.

1. A subscription television transmitter for translating a television signal during a program interval comprising: a generator for developing a television signal representing a scanned subject for transmission to subscriber receivers; a coding device coupled to said generator for varying the mode of transmission of said television signal to effect coding thereof in accordance with and in response to the characteristic variations of an applied coding signal; a first apparatus for developing a first coding signal having characteristic variations occurring at intervals determined by a predetermined coding schedule; a second apparatus for developing a second coding signal having characteristic variations occurring at intervals determined by a predetermined coding schedule distinctly different from and unrelated to the coding schedule of said first coding signal; selecting means coupled to said first and second apparatus for selectively applying said coding signals to said coding device; and control apparatus operable at spaced intervals long with respect to the aforesaid intervals determined by the coding schedules of said first and second coding signals but short with respect to said program interval for actuating said selecting means at corresponding spaced intervals in accordance with a selecting schedule having a random characteristic to determine the selective application of said coding signals to said coding device whereby a plurality of mode variations are effected between successive actuations of said selecting means during said program interval.

2. A subscription television transmitter for translating a television signal during a program interval comprising: a generator for developing a television signal representing a scanned subject for transmission to subscriber receivers; coding apparatus coupled to said generator for varying the mode of transmission of said television signal to effect coding thereof in accordance with and in response to the characteristic variations of an applied coding signal; a plurality of coding-signal sources for developing a plurality of coding signals respectively having characteristic variations occurring at intervals determined by different prescribed coding schedules; switching means coupled to said coding-signal sources for selectively applying said coding signals to said coding apparatus; a key-signal source for developing a key signal representing a selecting schedule having a random characteristic; and a control circuit coupled to said last-mentioned source and operable responsive to said key signal at spaced intervals long with respect to the aforesaid intervals determined by the coding schedules of said pluarlity of coding signals but short with respect to said program interval for actuating said switching means at corresponding spaced intervals in accordance with said selecting schedule to determine the selective application of said plurality of coding signals to said coding apparatus whereby a plurality of mode variations are effected between successive actuations of said selecting means during said program interval.

3. A subscription television transmitter for translating a television signal during a program interval comprising: a generator for developing a television signal representing a scanned subject; coding apparatus coupled to said generator for varying the mode of transmission of said television signal in accordance with and in response to the characteristic variations of an applied coding signal effectively to code said television signal; a plurality of coding-signal sources for developing a plurality of coding signals respectively having characteristic variations occurring at intervals determined by different prescribed coding schedules; switching means coupled to said coding signal sources for selectively applying said coding signals to said coding apparatus; a key-signal source for developing a key signal representing a random selecting schedule; a control circuit coupled to said last-mentioned source and operable responsive to said key signal at spaced intervals long with respect to the aforesaid intervals determined by the coding schedules of said plurality of coding signals but short with respect to said program interval for actuating said switching means at corresponding spaced intervals in accordance with said selecting schedule to determine the selective application of said first-mentioned coding signals to said coding apparatus whereby a plurality of mode variations are effected between successive actuations of said selecting means during said program interval; and means coupled to said generator and to said key-signal source for transmitting the coded television signal and key-signal information to subscriber receivers.

4. A subscription type of television receiver for utilizing a coded television signal having its mode of transmission varied selectively during a program interval in accordance with a plurality of different coding schedules selected in accordance with a selecting schedule having a random characteristic, said receiver comprising: an image-reproducing device; circuit means for supplying said television signal to said reproducing device; a decoding device coupled to said circuit means for effecting compensation in said receiver for the variations in mode of said television signal; a first apparatus for developing a first decoding signal having characteristic variations occurring at intervals determined by one of said plurality of coding schedules; a second apparatus for developing a second decoding signal having characteristic variations occurring at intervals determined by another one of said plurality of coding schedules distinctly different from and unrelated to the coding schedule of said first decoding signal; selecting means coupled to said first and second apparatus for selectively applying said decoding signals to said decoding device; means for developing a key signal representing said selecting schedule; and a control circuit coupled to said key-signal developing means and operable responsive to said key signal at spaced intervals long with respect to the aforesaid intervals determined by the coding schedules of said first and second decoding signals but short with respect to said program interval for actuating said selecting means at corresponding spaced intervals in accordance with said selecting schedule to determine the selective application of said decoding signals to said decoding device whereby a plurality of compensating mode variations are effected between successive actuations of said selecting means during said program intervals.

5. A coding-signal source for controlling a coding device to effect mode changes in a subscription system in accordance with and in response to the characteristic variations of a coding signal developed by said source during a program interval comprising: apparatus for developing a plurality of coding signals respectively having characteristic variations occurring at intervals determined by different prescribed coding schedules; selecting means coupled to said apparatus for selectively applying said coding signals to said coding device; means for developing a key signal representing a random selecting schedule; and a control circuit coupled to said key-signal developing means and operable responsive to said key signal at spaced intervals long with respect to the aforesaid intervals determined by the coding schedules of said plurality of coding signals but short with respect to said program interval for actuating said selecting means at corresponding spaced intervals in accordance with said selecting schedule to determine the selective application of said plurality of coding signals to said coding device whereby a plurality of mode changes are effected between successive actuations of said selecting means during said program interval.

6. A subscription type of television receiver for utilizing a television signal having its mode of transmission varied selectively during a program interval in accordance with a plurality of repeating code schedules selected in accordance with a random selecting schedule, said random selecting schedule being indicated by a key signal received concurrently with said television signal, said receiver comprising: an image-reproducing device; circuit means for supplying said television signal to said reproducing device; a decoding device coupled to said circuit means for effecting compensation in said receiver for the variations in mode of said television signal; a plurality of signal sources for developing a plurality of repeating decoding signals respectively having characteristic variations occurring at intervals determined by said plurality of repeating code schedules; switching means coupled to said signal sources for selectively applying said decoding signals to said decoding device; apparatus for selecting said key signal; and a control circuit coupled to said selecting apparatus and operable responsive to said key signal at spaced intervals long with respect to the aforesaid intervals determined by the coding schedules of said decoding signals but short with respect to said program interval for actuating said switching means at corresponding spaced intervals in accordance with said random selecting schedule to determine the selective application of said decoding signals to said decoding device whereby a plurality of compensating mode variations are effected between successive actuations of said selecting means during said program interval.

References Cited in the file of this patent

UNITED STATES PATENTS

| | | |
|---|---|---|
| 2,251,525 | Rosenthal | Aug. 5, 1941 |
| 2,402,058 | Loughren | June 11, 1946 |
| 2,495,727 | Hutchinson | Jan. 31, 1950 |
| 2,545,770 | Ellett et al. | Mar. 20, 1951 |
| 2,573,349 | Miller et al. | Oct. 30, 1951 |
| 2,632,799 | Cotsworth et al. | Mar. 24, 1953 |
| 2,656,407 | Herrick et al. | Oct. 20, 1953 |
| 2,656,409 | Morris et al. | Oct. 20, 1953 |